UNITED STATES PATENT OFFICE.

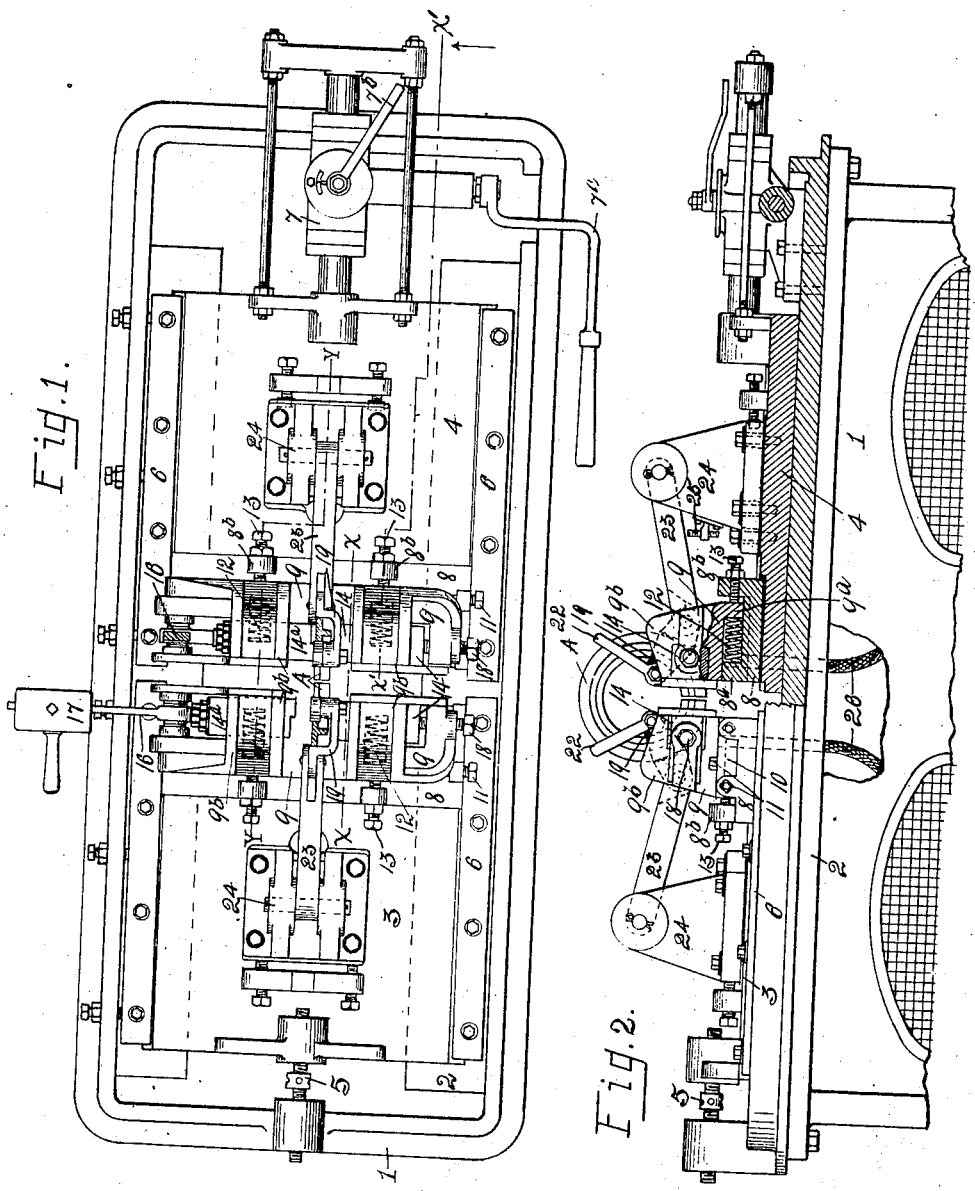

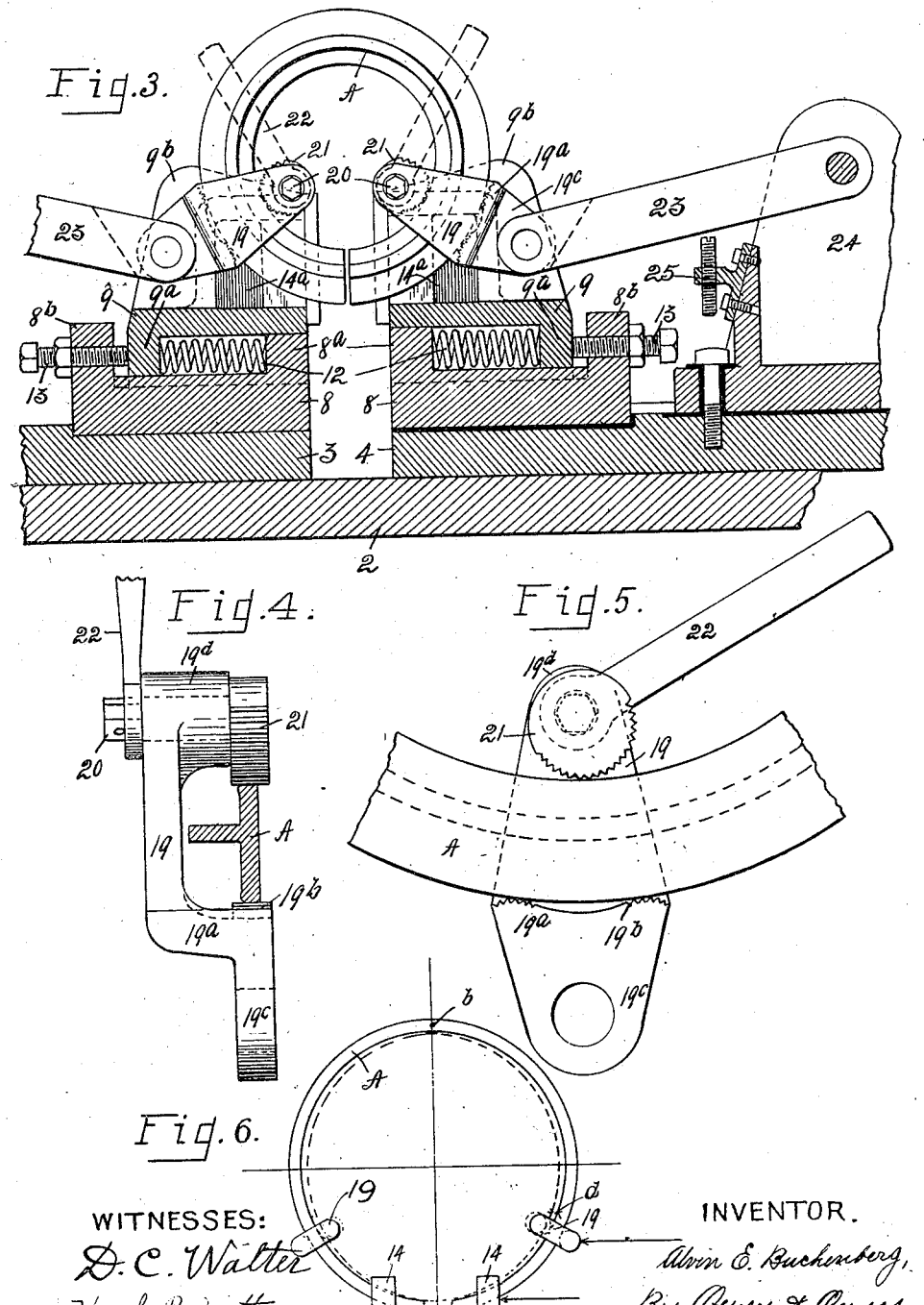

ALVIN E. BUCHENBERG, OF TOLEDO, OHIO, ASSIGNOR TO THE TOLEDO ELECTRIC WELDING COMPANY, OF TOLEDO, OHIO, A CORPORATION OF OHIO.

ELECTRIC METAL-WORKING APPARATUS.

No. 913,616.　　　Specification of Letters Patent.　　　Patented Feb. 23, 1909.

Application filed June 25, 1908. Serial No. 440,230.

*To all whom it may concern:*

Be it known that I, ALVIN E. BUCHENBERG, a citizen of the United States, and a resident of Toledo, in the county of Lucas and State of Ohio, have invented a certain new and useful Electric Metal-Working Apparatus; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to electric metal-working apparatus designed for use in welding, forging, upsetting, and other operations wherein the work is heated to the desired condition of plasticity for such purposes by the passage therethrough of an electric current, and has particular reference to the work-holding or clamping means employed in apparatus of this class for holding circular or other shaped articles the opposite ends of which are to be forced together for the purpose of welding. In operating on articles of this class, especially when of sufficient area in cross-section to materially effect the flexibility thereof, it is found that the resistance of the article to having its ends forced together causes the work-gripping jaws or clamps, unless very powerful, to slip thereon, thus either failing entirely to force the ends into abutment to make the weld or not with sufficient force to effect a perfect weld.

The object of my invention is to overcome this objectionable feature in welding the ends of rings or similar articles by the provision, in combination with the main work-clamping or contact parts, of auxiliary clamping parts which firmly grip the work and act to force the ends thereof together when any slipping occurs between the main clamping parts and the work.

The operation, construction and arrangement of the parts of the invention are fully described in the following specification and illustrated in the accompanying drawings, in which,—

Figure 1 is a plan of an electric metal working machine embodying the features of my invention, with one set of main work-clamping parts in contact with the work, and the work and one clamp-operating lever in section. Fig. 2 is a side elevation of the machine with a portion thereof in section along a portion of the line $x'$ $x'$ in Fig. 1. Fig. 3 is an enlarged longitudinal vertical section of a portion of the machine with the upper or clamp-carrying blocks in section on the line $x$ $x$ and the parts below in section on the line $y$ $y$ in Fig. 1. Figs. 4 and 5 are different enlarged views of the auxiliary clamps in engagement with a portion of the work, and Fig. 6 is a diagram of the action of the clamping parts on the work.

Referring to the drawings, 1 designates a supporting frame of any suitable construction on the top 2 of which are mounted the tables 3 and 4, which carry the work holding parts. One of these tables is preferably fixed to the support while the other, which is designated 4 in the drawing, is mounted for movement toward and away from the contiguous end of the fixed table, as is customary in this class of apparatus. The table 3 while intended to be fixed during the operation of the machine, is preferably mounted for adjustment longitudinally of the support to adapt it for operating on different sizes of work, the adjustment thereof being effected by the turning of the right and left screw 5, which coöperates with the table and support for such purpose, or this adjustment may be effected in any other suitable manner. The tables 3 and 4 are guided in their respective adjusting and working movements by gibs 6. While movement may be communicated to the table 4 by any suitable means, that shown in the drawing for such purpose comprises a hydraulic jack or other fluid pressure device 7 of which 7ª is the pumping handle and 7ᵇ the change lever.

Carried at the inner end portion of each table 3, 4, in fixed relation thereto is a pedestal block 8, which has a shoulder 8ª rising from its inner edge and a shoulder or lugs 8ᵇ rising from its outer edge. Movably supported by each of the blocks 8 is a clamp-carrying block 9 the inner lower edge of which rests on the shoulder 8ª of the pedestal block while its rear or outer edge is provided with a pendent leg or shoulder 9ª, which slidingly rests on the block 8 between the shoulders 8ª and 8ᵇ thereof, as shown in Figs. 2 and 3. The blocks 9 are held to their respective pedestal blocks 8 for movement longitudinally of the tables 3, 4 by gibs 10, which are secured to the ends of the pedestal blocks by screws 11.

12 designates coiled compression springs which are disposed between the blocks 8 and 9 of each table with their opposite ends in abutment with the shoulders 8$^a$ and 9$^a$ of said blocks, as shown in Figs. 2 and 3, thus tending to yieldingly hold the blocks 9 at their limits of outward or rearward movements relative to their respective pedestal blocks 8, which movements are controlled by stop-screws 13 carried by the lugs or shoulders 8$^b$ of the blocks 8.

Each clamp-carrying block 9 is formed with the two elevated portions 9$^b$, which are spaced apart transversely of the direction of yielding movement of the block to permit an insertion of the work A therebetween, as shown. A fixed work-clamp or contact part 14 is mounted in one and a movable work-clamp or contact part 14$^a$ is mounted in the other of the elevated portions of each block 9 with their ends projecting within the space between such parts in position to grip the opposite faces of an interposed article A. Coacting with the outer end of each movable clamp 14$^a$ is a cam-lever 16, which is adapted when raised from its normal reclining position, which position it seeks due to the influence thereon of the weight 17 or other suitable means, to force the clamp 14$^a$ toward its companion whereby to grip the work therebetween. The movable clamps 14$^a$ may be moved to open position either by the opening action of said levers or in any other suitable manner. The fixed clamps 14 are shown as being adjustably mounted within their block portions 9$^b$ due to their outer ends abutting against adjusting-screws 18, which are carried by the blocks 9.

The auxiliary clamping means with which I have provided my machine comprises the two members 19, 19, each of which is provided at one end with the lateral offset portion 19$^a$ having the inner work-gripping surface 19$^b$ and tail-piece 19$^c$ and at its other end with the bearing 19$^d$, the bore of which is disposed in the same general direction as the offset 19$^a$. Mounted in this bearing is a short shaft 20 which carries at one end a cam-shaped gripping jaw 21 in the plane of the gripping-surface 19$^b$ and has its other end projecting beyond the bearing and fashioned to receive a lever handle 22. It is thus apparent that the work when placed between the gripping-surface 19$^b$ and cam-jaw 21 may be firmly gripped thereby by simply turning the cam 21 in the proper direction for such purpose. The members 19 are intended to be gripped to the ring or work A on opposite sides of its ends or point to be welded and at places more remote from the ends of the work than the points of engagement therewith of the respective sets of clamps 14, 14$^a$, and each has its tail-piece 19$^c$ pivoted to a link member 23, which is in turn pivoted at its outer end to a standard or upright part 24 rigidly rising from the table 3, 4 over which the respective link projects, as shown. The members 19 when in engagement with the work preferably stand at an angle to their links 23 or out of direct axial alinement therewith so that a force exerted on each member 19 by the link will be approximately in line with the ends of the work to be welded. The purpose of connecting the auxiliary clamps to their respective tables by the pivotal links 23 instead of rigidly attaching them to the tables is to enable an adjustment of the clamps to adapt them to engage with rings or similar work of different diameters, as the greater the diameter of the work the greater will be the vertical inclination of the clamps or the angles thereof relative to their links. A screw 25 is carried at the inner side of each upright 24 for limiting the lowering movement of the associated link 23.

It will be noted that the set of jaws 14 14$^a$ and the auxiliary clamping-means which engage the same end of the work clamp different opposing sides or faces thereof, or in other words, the jaws 14 14$^a$ clamp the front and rear sides of the end and the gripping-surfaces of the auxiliary clamping-means clamp the upper and lower sides of such end, thus causing all four sides to be embraced.

26, 26 designate suitable conductors which connect the clamp-carrying blocks 9, 9 with a transformer or other suitable source of electricity (not shown) adapted for supplying heating-currents of large volume but of low electro-motive force to said blocks 9, 9 and the clamps 14, 14$^a$ carried thereby, as is customary in this class of machines. The movable table 4 is insulated from its pedestal block 8 and upright 24 in a suitable manner, as shown, to permit a closing of the circuit through the ends of the work when brought in contact.

The operation of my invention is as follows:—The work A being gripped between the clamps 14, 14$^a$ of each block 9 by a raising of the cam-levers 16, 16 so as to effect a perfect electrical contact between the work and said clamps, and the auxiliary clamping-members also being firmly gripped to the work above or to the rear of the points of engagement therewith of the clamps 14, 14$^a$ as above described, the handle 7$^a$ of the hydraulic-jack 7, if such power means is employed, is then operated to cause an inward movement of the table 4 and the parts carried thereby for the purpose of forcing the ends of the work together to permit the heating-current to pass therethrough to effect an electric welding of such ends. As the compressing stress is brought to bear on the work the resistance thereof to such stress may cause the clamps 14, 14$^a$ to slip in contact therewith, and if so the auxiliary clamps 19 then act to force the ends together. The action of the work clamping parts as the table moves forward to force the ends of the work together will be best understood by reference to Fig. 6, which is a diagrammatical illustration of such action. Suppose the two vertical halves of the work A to be levers which are fulcrumed as at a point $b$ and engaged by the clamps 14, 14ª and the auxiliary clamping members 19 at the points indicated, which are approximately the relative positions of such parts. It will now be apparent by reference to the dotted line, which represents the positions of such levers or halves in their compressed state, that the required distance of movement $c$ of each lever end or end of the work is greater by approximately the distance $d$ than that of the auxiliary clamps 19, and it will be apparent by the same reasoning that each set of clamps 14, 14ª will have a greater distance of movement than the associated auxiliary clamp 19, due to the latter being placed nearer to the fulcrum point of the engaged lever or work half than the main set of clamps. This difference in movement of the auxiliary and main clamps is allowed for by the yieldingly mounting of the clamp-carrying blocks 9, as this permits said blocks, actuated by the clamps 14, 14ª, to have inward movements relative to their respective pedestal blocks 8. It will thus be seen that the clamps 14, 14ª serve mainly as electrodes adapted to have close electrical contact with the work while the auxiliary clamping members act to force the ends of the work together.

While I have shown and described the features comprising the gist of my invention as being associated with a particular construction of machine, I wish it understood that I do not restrict the invention for use in such connection, and also that numerous changes in the construction and arrangement of the parts of the invention may be made without departing from the spirit thereof.

Having thus described my invention, what I claim as new and desire to secure by Letters Patent, is,—

1. In an electric metal-working apparatus, the combination of relatively movable sets of work contacting electrodes, and means movable with the electrodes and coöperating therewith to grip the work, said means being capable of acting on the work to force its ends together when the electrodes slip in contact therewith.

2. In an electric metal-working apparatus, the combination with relatively movable sets of work-gripping parts, of auxiliary clamping means which automatically act to force the work ends together when the first mentioned work-gripping parts slip in contact therewith.

3. In a machine for electrically welding together the opposite ends of articles, the combination with relatively movable sets of main work-clamping parts, of auxiliary clamping parts for acting on the work to force the ends thereof together when the main clamping parts slip in contact with the work, and means for permitting relative movements of the main and auxiliary clamping-parts in engagement with the same end portions of the work.

4. In a machine of the class described, separate means for gripping the same end portion of the work, the gripping means for the opposed ends of the work being capable of relative converging and retracting movements, and means for permitting relative movements of the separate gripping means in engagement with the same end portion of the work.

5. In a machine of the class described, two tables capable of relative converging and retracting movements, means for effecting such movements, a clamp carrying part associated with each table, opposed work gripping members carried by each of said parts, and separate work gripping means carried by each table and adapted to coöperate with the first mentioned gripping members to force the ends of the work together when the tables have relative converging movements.

6. In a machine of the class described, two tables capable of relative converging and retracting movements, means for effecting such movements, work-gripping clamps carried by each table, and means carried by each table and adapted to coöperate with the gripping clamps to force the ends of the work together when the tables have relative converging movements.

7. In a machine of the class described, two tables capable of relative converging and retracting movements, means for effecting such movements, a block yieldingly carried by each table, opposed work-gripping jaws carried by each block, and separate work-gripping means having link connection with each table and adapted to be attached to the work at a point more remote from the associated end thereof than the point of engagement therewith of the gripping-jaws and to coöperate with said gripping jaws to force the ends of the work together.

8. In a machine of the class described, the combination of two relatively movable work-carrying parts, a set of jaws associated with one of said parts for clamping opposed sides of the work, and a set of jaws associated with the same part for clamping two other opposed sides of the work than those clamped by the first mentioned jaws, substantially as described.

9. In a machine of the class described, the combination with two relatively movable clamp-carrying parts or tables, of a set of jaws on each part or table for clamping two of the opposed sides of the work, and a set of jaws on each part or table for clamping two other opposed sides of the work and adapted to coöperate with the first mentioned jaws to force the work ends together when said parts or tables have relative converging movements.

10. In a machine of the class described, the combination with relatively movable tables, of a jaw carried by each table and adapted to engage one side of the work and having a part offset from its gripping surface for extending around a side of the work, a cam-jaw carried by said offset part for engaging the opposed side of the work to that engaged by said first jaw, and means for operating said cam to firmly grip the work.

11. In a machine of the class described, the combination of relatively movable work-carrying tables, a frame part fixed relative to one of such tables, a link pivoted to the frame part, and a work gripping member pivotally attached to the link and capable of being attached to rings of different diameter.

In testimony whereof I have hereunto signed my name to this specification in the presence of two subscribing witnesses.

ALVIN E. BUCHENBERG.

Witnesses:
C. W. OWEN,
CORNELL SCHREIBER.